J. H. Sperbeck
Horse Collar
No 75590    Patented Mar 17, 1868
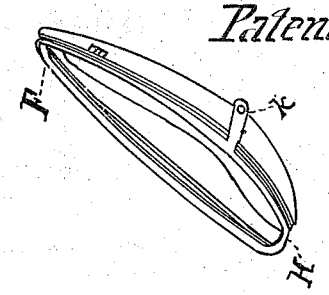
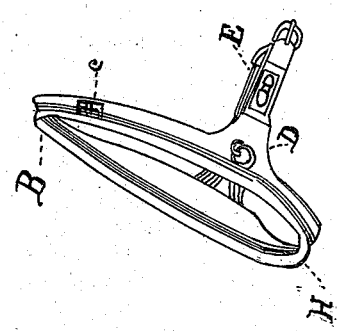
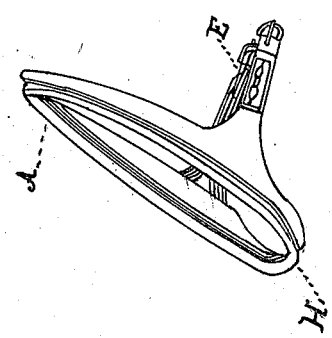
Inventor
James H. Sperbeck
Witnesses.
D. N. Jincks
B. A. Pierce

United States Patent Office.

JAMES H. SPERBECK, OF WARSAW, NEW YORK.

Letters Patent No. 75,590, dated March 17, 1868.

IMPROVED HORSE-COLLAR.

*The Schedule referred to in these Letters Patent and making part of the same.*

TO ALL WHOM IT MAY CONCERN:

Be it known that I, JAMES H. SPERBECK, of Warsaw, in the county of Wyoming, and State of New York, have invented certain new and useful Improvements in "Horse-Collars;" and do hereby declare that the following is a full, clear, and exact description thereof, reference being had to the accompanying drawings, and to the letters of reference marked thereon, making a part of this specification.

This invention consists in a horse-collar and hames combined, having the traces permanently attached to it, as hereinafter described. In the annexed drawings—

Figures A B represent my improved collar, while

Figure F represents the ordinary hames and collar.

The rim of my collar may be made of wood, iron, or any other suitable material, and is attached to the collar, and covered with the leather of the said collar, thereby uniting the two parts in one. The line-terret as well as the trace-hasp is attached to the embedded rim. The main portion of the collar is provided with two extended ears D E, which have suitable buckles on their ends, as shown, for connecting the traces. The traces may be attached by passing them around the rim and stitching them down to the collar-pad; the object of which is to make it stronger at the end of the trace where the same is passed around the rim, and to allow the draught to be even on the horse and in the proper place. The ring for the breast-strap, drawing B, passes by a staple into the pad just back of the point H, and the staple is fastened to a strip of iron placed inside of the pad. The rim used may be either solid or it may be buckled or jointed at either or both top and bottom. The ring for the breast-strap may be fastened near the rim through the hasp. The manner of fastening the trace to the hasp may be by joint or other known fastening.

Having thus fully described my invention, what I claim as new, and desire to secure by Letters Patent, is—

The combination of the elongated ears E D with the hameless horse-collar, as described, when constructed substantially as set forth.

JAMES H. SPERBECK.

Witnesses:
B. N. PIERCE,
D. N. JINCKS.